June 8, 1948.	W. W. PAGET	2,442,780
PRESSURE REGULATING VALVE MECHANISM
Filed April 11, 1945	2 Sheets-Sheet 1

Inventor:
Win W. Paget.
by
Lewis A. Watson
Atty.

June 8, 1948. W. W. PAGET 2,442,780
PRESSURE REGULATING VALVE MECHANISM
Filed April 11, 1945 2 Sheets-Sheet 2

Inventor:
Win W. Paget.
by
Louis A. Maxson.
Atty.

Patented June 8, 1948

2,442,780

UNITED STATES PATENT OFFICE 2,442,780

PRESSURE-REGULATING VALVE
MECHANISM

Win W. Paget, Michigan City, Ind., assignor to Joy Manufacturing Company, a corporation of Pennsylvania Application April 11, 1945, Serial No. 587,664

18 Claims. (Cl. 98—1.5)

My invention relates to pressure regulating valve mechanisms, and more particularly to valve mechanisms for regulating the pressures in the cabin of an aircraft.

It is desirable that an aircraft, especially one that is adapted to fly at high altitudes, be provided with some means for controlling the pressures in its cabin. These pressures may be permitted to vary with the ambient pressures while the aircraft is flying below a predetermined elevation, an elevation of 8000 feet being considered as a suitable upper limit of flight with uncontrolled pressure. From the 8000 ft. elevation to some predetermined higher elevation, such as, for example, 24,000 feet, the cabin pressure is desirably maintained constant. The upper limit of flight with constant cabin pressure is determined by various factors, of which for commercial planes the strength of the cabin, that is, the ability of the cabin to withstand strains produced by pressures within the cabin exceeding the pressures at its outer surfaces, is an important one. When the aircraft reaches whatever altitude has been selected as the upper limit of constant cabin pressure maintenance, herein, according to the example given, the 24,000 ft. elevation, means should operate to reduce the cabin pressure at a controlled rate as the elevation of flight increases so that extremely high elevations may be reached without subjecting the cabin to an undue strain.

An object of my invention is to provide an improved means for controlling the pressures in the cabin of an aircraft. Another object is to provide an improved valve mechanism for controlling communication between the interior and exterior of an aircraft cabin. Still another object is to provide an improved valve mechanism which is operative to maintain a constant pressure in the cabin of an aircraft during flight within a predetermined range of elevations, and permits cabin pressure to drop in a predetermined manner as flight increases above the upper limit of said range. Yet another object is to provide an improved valve mechanism for controlling the venting of a cabin to which air is supplied continuously. Other objects will appear in the course of the following description.

In the drawings in which there is shown one illustrative form which my invention may assume in practice:

Figure 1:
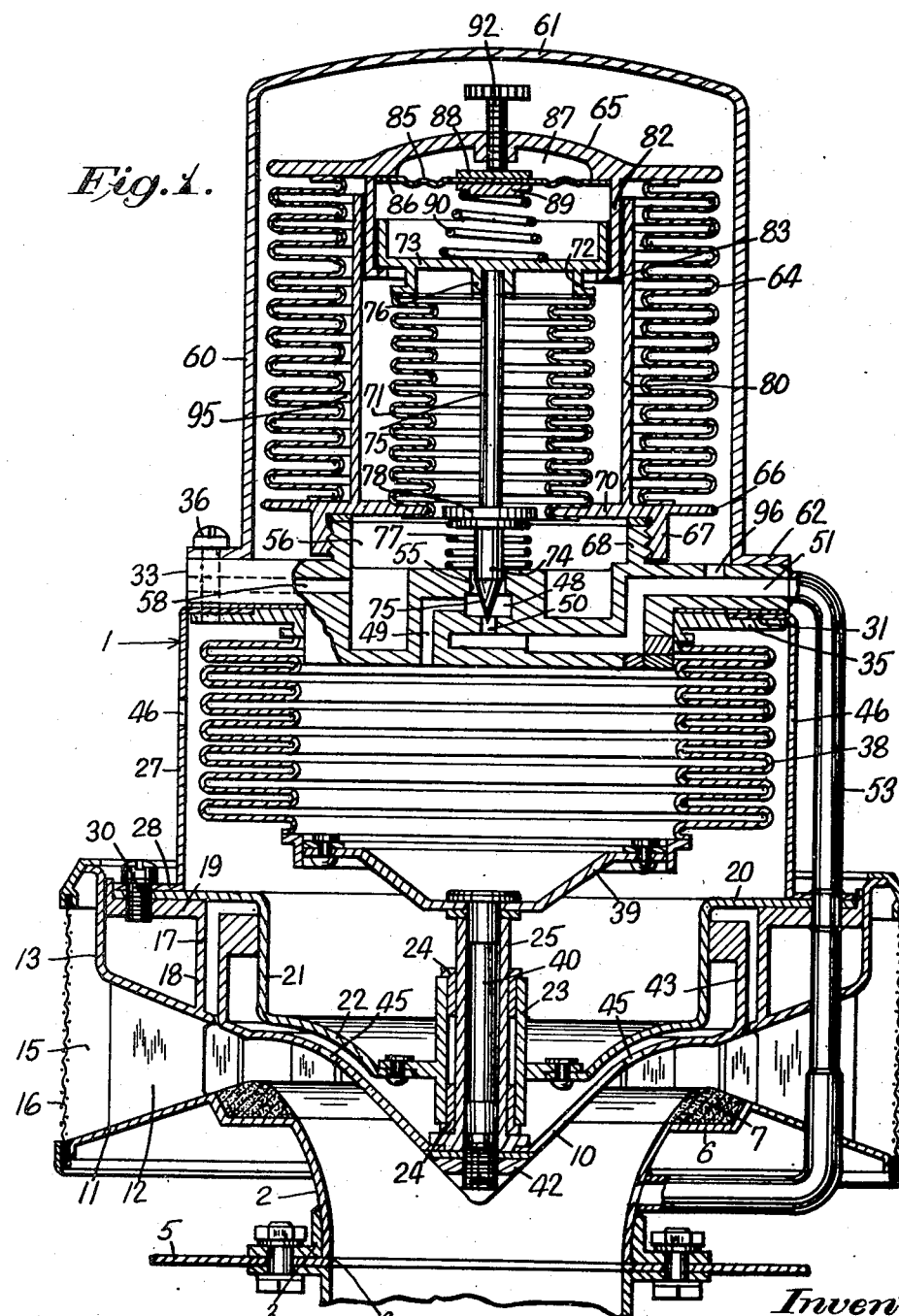
Fig. 1 is a vertical sectional view of a preferred form of my improved valve mechanism.

In the illustrative embodiment of my invention, there is shown a valve mechanism, generally designated 1, for controlling communication between the cabin of an aircraft and the exterior of the latter. This valve mechanism is shown herein as comprising an annular member 2 supported by a collar 3 in position over a port 4 formed in the wall 5 of the cabin of an aircraft. The annular member 2 is provided with a portion 6 which supports a seat providing member 7 in a position to be engaged by a valve member 10 for cutting off communication between the interior and exterior of the cabin. Extending outwardly from the portion 6 is a flared portion 11 supporting webs 12 which carry another flared portion 13 forming with the portion 11 an annular passage 15 which opens into the interior of the cabin. Secured between the portions 11 and 13 is a screen 16 which operates to prevent foreign matter from gaining admission to the passage 15. Arranged above the flared portion 13 is an annular member 17 having a vertical wall portion 18 and a horizontal wall portion 19, the wall portions 18 and 19 being connected to the portion 13, as by welding. Resting upon the wall portion 19 is a member 20 having a depending annular wall portion 21 and a lower inwardly projecting wall portion 22. Suitably connected to the wall portion 22 is a sleeve shaped member 23 carrying bushings 24 which slidably receive a tubular member 25.

Arranged in axial alinement with the port 4 is a casing 27 having a flange portion 28 at its lower end resting upon the member 20. The flange portion 28 and the member 20 are connected to the wall portion 19 of the member 17, as by screws 30. The upper end of the casing 27 is provided with an inwardly projecting flange portion 31 which supports a circular plate member 33 closing the upper end of the casing. Arranged beneath the flange portion 31 is an annular member 35, and the members 35 and 33 are clamped to the flange portion 31, as by screws 36. Arranged within the casing 27 is a bellows device 38 which is connected at its upper end, as by brazing, to the annular member 35 and which is connected at its lower end in a similar manner to a closure plate 39. A bolt 40 projects through an opening in the closure plate 39 and extends through the tubular member 25 and through an opening in the valve member 10. A nut 42 threaded upon the lower end of the bolt 40 clamps the valve member 10 and the closure plate 39 to opposite ends of the tubular member 25 for movement therewith. The valve member 10 is provided at its outer edge with an upwardly projecting portion 43 which slidably engages the wall portion 21. It will be seen that movement of the valve member relative to its seat is guided by the bushings 24 and the wall portion 21. Ports 45 formed in the valve member 10 connect the spaces at its opposite sides in communication with each other so that the pressures upon the valve member are balanced. Formed in the side wall of the casing 27 are ports 46 connecting the space surrounding the bellows device 38 in communication with the interior of the cabin. Formed in the plate member 33 is a chamber 48 which is connected by a passage 49 in communication with the interior of the bellows device 38. A port 50 opens from the chamber 48 into a passage 51 which is connected by a conduit 53 in communication with the interior of the annular member 2 at a point where the pressures are always equal to the pressures at the exterior of the cabin. The chamber 48 also opens through a port 55 into communication with a chamber 56 at the upper side of the plate 33. A passage 58 in the plate 33 connects the chamber 56 in communication with the interior of the cabin.

Arranged on the plate 33 is a casing 60 which is closed at its upper end by a wall portion 61 and which is provided at its lower end with a flange portion 62 which is adapted to be clamped to the plate 33, as by the screws 36. Arranged within the casing 60 is a bellows device 64 which is connected at its upper end, as by brazing, to a closure plate 65 and which is connected at its lower end in a similar manner to an outwardly projecting flange portion 66 formed on a member 67 which is threadedly connected to an upwardly projecting annular portion 68 formed on the plate member 33. The member 67 is provided with an inwardly projecting flange portion 70 to which the lower end of a bellows device 71 is connected, as by brazing, and the upper end of the bellows device 71 is connected in a similar manner to a flange portion 72 formed on a closure plate 73. Extending through the opening 55 in the plate 33 is a valve member 74 having a tapered portion 75 which cooperates with the port 50 for controlling communication between the chamber 48 and the passage 51. The transverse dimensions of the valve member are such as to provide a restricted clearance between it and the wall of the port 55 for connecting the chamber 48 in communication with the chamber 56. The flow area between the valve 74 and the wall of the port 55 is distinctly less than that through port 50 and passage 51. Projecting upwardly from the valve member 74 is a stem 75 having its upper end portion extending into a recess formed in a portion 76 integral with the closure plate 73. A spring 77 surrounding the valve member 74 and acting between the upper surface of the plate 33 and an abutment member 78 fixed to the valve stem operates to hold the upper end of the valve stem in the recess in the portion 76 and to urge the valve member toward a position connecting the chamber 48 in communication with the passage 51. Projecting upwardly from the member 67 is a sleeve portion 80 which is engageable by the closure plate 65 for limiting the movement of the latter in a downward direction. Formed integral with the closure plate 65 is a sleeve portion 82 extending downwardly within the sleeve portion 80 and having at its lower end an inwardly projecting flange portion 83 which is engageable with the lower surface of the closure plate 73. The lengths of the sleeve portions 80 and 82 are such that only a slight clearance exists between the flange portion 83 and the plate 73 when the latter is in a position seating the valve member 74 and the plate 65 is in a position engaging the sleeve portion 80. A diaphragm 85 is connected, as by brazing, to an annular surface 86 on the closure plate 65 at the edge of a central recess 87. Reinforcing plates 88 and 89 are attached to the central portion of the diaphragm 85, and a spring 90 acting between the reinforcing plate 89 and the closure plate 73 tends to move the latter into engagement with the flange portion 83 carried by the plate 65. An adjustable screw 92 threaded through an opening in the closure plate 65 into engagement with the reinforcing plate 88 operates to control the tension of the spring 90. The space 95 between the bellows devices 64 and 71 is evacuated as is also the communicating space between the diaphragm 85 and the plate 73. The interior of the bellows device 71 communicates with the chamber 56, the pressure in this chamber being maintained equal to cabin pressure by reason of its connection with the cabin through the passage 58. The space within the casing 60 surrounding the bellows device 64 is connected by a port 96 in communication with the passage 51 so that the pressure therein may be equal to the pressure at the exterior of the cabin. The tension of the spring 90 is so adjusted that the plate 73 is moved downwardly when the pressure at the interior of the bellows device 71 is equal to the ambient pressure at the 8000 ft. elevation.

The ratio of the ambient pressure at 8000 feet to the ambient pressure at 24,000 feet is 22.23 to 11.59. Accordingly the ratio of the effective area of bellows 64 to that of bellows 71 should be substantially 22.23 to 11.59.

Spring 90 should just cause valve 74 to seat when cabin pressure falls to the ambient pressure at 8000 feet. Accordingly, since the exterior of bellows 71 is subjected to substantially zero pressure, the pressure exerted by the spring in the position of the parts shown in Fig. 3 will, ignoring for the purpose of simplicity the resilience of the bellows 71 and the pressure exerted by spring 77, be equal to $22.23'' \text{Hg} \times A^{71}$, when $A^{71}$ is the effective area of bellows 71. This same pressure of $22.23'' \text{Hg} \times A^{71}$ is tending to expand the bellows 64.

Figure 2:
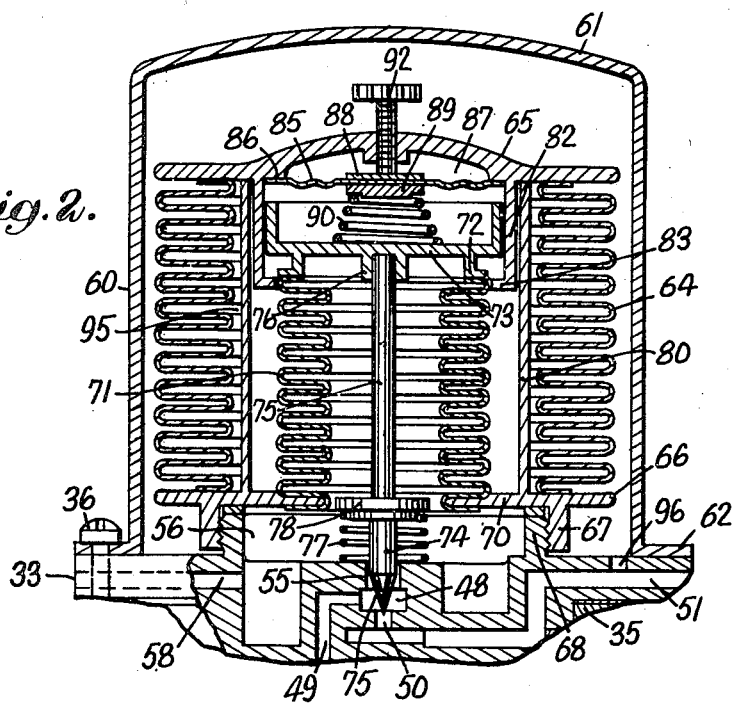
Fig. 2 is a view of a portion of the valve mechanism, taken on the plane of Fig. 1 but with parts shown in different positions.
Figure 3:
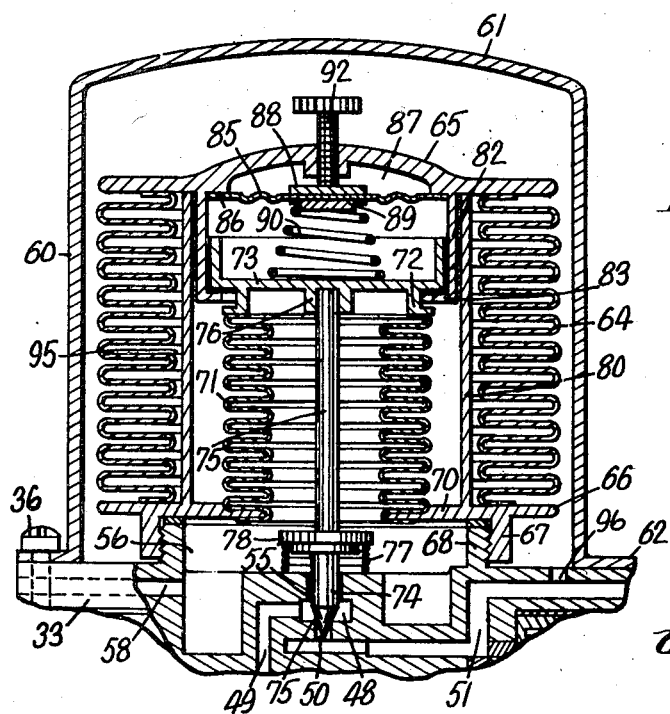
Fig. 3 is a view like that of Fig. 2 but with parts shown in still different positions.

Again ignoring the resilience of both bellows and the spring 77 for the purpose of simplicity, it will be noted that bellows 64 will be maintained in the position of Figs. 2 and 3 until such time as the product of the ambient pressure on area $A^{64}$ (the effective area of bellows subjected to ambient pressure) multiplied by that area is less than the pressure transmitted through the spring 90 to the diaphragm 85, which is, of course, equal to the product of cabin pressure multiplied by area $A^{71}$.

It is desired that valve 74 reopen to cause cabin pressure to be maintained at a predetermined ratio to ambient pressure when ambient pressure drops to 11.59 inches of mercury (the pressure at 24,000'). Therefore $$11.59'' \text{Hg} \times A^{64} = 22.23'' \text{Hg} \times A^{71}$$

and $$A^{64} = \frac{22.23}{11.59} \times A^{71}$$

With these area ratios, the desired ratio of cabin pressure to ambient pressure above 24,000' altitude will be maintained, and above that altitude the spring 90 will maintain contact between the head 73 and the shoulder 83, and the parts 65, 92, 88, 85, 89, 90 and 73 will move together as a unit, permitting the valve 74 to be opened by the spring 77 when the ratio of cabin pressure to ambient pressure exceeds $$\frac{22.23}{11.59}$$

and closing valve 74 when the ratio of cabin pressure to ambient pressure is less than $$\frac{22.23}{11.59}$$

In the foregoing the slight pressure exerted by the spring 77 has not been figured in, but it will be obvious that since it acts in the direction of cabin pressure a slight reduction in $A^{71}$ might be made, but this is not, practically, worth bothering about, as is also the case with the very slight expansion of spring 90 permitted in the transition from the relative position of plate 73 to shoulder 83 in Fig. 3 to that in Fig. 1.

The operation of the improved valve mechanism described above is as follows: When the aircraft is resting on an airfield, the atmospheric pressure acting through the conduit 53, the passage 51 and the port 96 on the exterior of the bellows device 64 will cause the latter to be compressed against the action of the sub-atmospheric pressure at its inner surface, until the plate 65 engages the upper end of the sleeve portion 80. The pressure within the cabin will be the same as the atmospheric pressure, and this cabin pressure acting through the passage 58 and the chamber 56 on the interior of the bellows device 71 will cause the latter to be expanded against the action of the sub-atmospheric pressure and the spring 90 until the plate 73 either is stopped by the plate 65 or is held against further movement by the spring 90. The bellows devices 64 and 71 and their closure plates 65 and 73 will be in the positions shown in Fig. 2, and the valve member 74 will be held in its open position by the spring 77. The interior of the bellows device 38 will then communicate with the exterior of the cabin through the passage 49, the chamber 48, the port 50, the passage 51 and the conduit 53, and, since the exterior pressure equals cabin pressure, the bellows device will be expanded and seat the valve member 10.

If the engines of the aircraft are now started and drive a supercharger for delivering air to the cabin, the pressure within the cabin will build up until it is sufficient to compress the bellows device 38 and unseat the valve member 10. The increase in cabin pressure over external pressure needed for unseating the valve member 10 is very slight and as soon as the valve member 10 is unseated, the cabin pressure drops until the bellows device 38 expands and moves the valve member toward its closed position again. The result is a positioning of the valve member 10 so as to maintain a cabin pressure which exceeds only slightly the exterior pressure. As the aircraft takes off from the landing field and ascends, the valve mechanism permits the cabin pressure to drop with the exterior pressure. When the elevation of 8000 feet is reached, the pressure within the bellows device 71 will have dropped to a value low enough so that the spring 90 will compress the bellows device and seat the valve member 74, as shown in Fig. 3, cutting off communication between the interior of the bellows device 38 and the exterior of the cabin. Cabin pressure conducted from the chamber 56 through the port 55 and passage 49 to the interior of the bellows device 38 will cause the latter to expand and seat the valve member 10. If the cabin pressure then increases to a value above that at the 8000 ft. level, the bellows device 71 will be expanded and unseat the valve member 74, connecting the interior of the bellows device 38 to the exterior of the cabin. It will be seen that the operation of the bellows device 38 under the control of the valve member 74 will be such as to maintain constant cabin pressure while the aircraft climbs to elevations above 8000 feet. When the elevation of 24,000 feet is reached, the pressure in the space surrounding the bellows device 64 will have dropped to such a low value that this bellows device will be expanded, as shown in Fig. 1, by the force exerted by cabin pressure on the plate 73 and transmitted by the spring 90, diaphragm 85, etc., to the head 65 of the bellows 64. Upward movement of plate 73 will permit unseating of the valve member 74 and thus effect connection of the interior of the bellows device 38 with the exterior of the cabin causing the valve member 10 to be unseated. The cabin pressure will then drop until the reduced pressure at the interior of the bellows device 71 causes the bellows devices 64 and 71 to be compressed again and seat the valve member 74. It will be understood that during flight above 24,000 feet the pressures exerted on plates 65 and 73 will be insufficient to compress the spring 90 enough to effect separation of the plate 73 from the flange 83, so that the bellows devices 64 and 71 act as if the bellows device 71 were connected directly to the plate 65. As the aircraft increases its elevation of flight over 24,000 feet, the valve member 10 will be controlled in such a manner that a constant ratio between cabin and exterior pressure will be maintained. This will be understood by noting that the effective area subjected to external pressure substantially exceeds the effective area subjected to cabin pressure.

It will be noted that the bellows device 38, 39 constitutes a pressure responsive member subjected exteriorly continuously to cabin pressure, and interiorly connected to cabin pressure and connectible, while the cabin pressure connection still remains, to external pressure through a venting passage 51, said pressure responsive member controlling the position of the valve 10, which controls the flow of fluid through the port 4, through which the cabin may be vented to atmosphere; that the end or support member 67, the coaxial, respectively external and internal bellows or collapsible members 64 and 71, each of which is fixed at one end, and the head members 65, 85 and 73 constitute an evacuated expansible chamber device having opposite end walls 65, 85 and 73, of which the former (65, 85) is the larger and each of which is movable relative to the other; that the flange 83 and the edge of the plate 73 constitute means for limiting relative separate movement of the end walls; that the spring 90 constitutes means for yeldingly urging the end walls apart; that the stem 75 and spring 77 constitute means for operatvely connecting the valve element 74 to one of the walls (73) for movement therewith; that the lower side of wall 73 is subjected to cabin pressure while the upper side of 65 is subjected to ambient pressure, i. e. pressure at the exterior of the cabin; and that cabin and ambient pressures are those which exist at opposite sides of the valve seat 7. It will also be noted that the parts 64, 65, 85 overlie the parts 71, 73.

As a result of my invention there is provided an improved valve mechanism for controlling the pressures in the cabin of an aircraft. It will be noted that the valve mechanism is extremely compact by reason of the provision of a pressure responsive device which operates alone to provide one type of pressure control and which operates with another pressure responsive device to provide a different type of control.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. A mechanism for controlling the cabin pressures of an aircraft comprising, in combination, a port, a valve seat surounding said port, a valve member cooperating with said valve seat for controlling the flow of fluid through said port, a pressure responsive member for controlling the operation of said valve member, passage means for connecting a surface on said pressure responsive member in communication with the spaces at opposite sides of said valve seat, a valve element for controlling communication through one of said passage means, and an evacuated expansible chamber device for controlling said valve element, said expansible chamber device having opposite end walls each movable relative to the other, means for limiting relative movement of said end walls, means operatively connecting said valve element to one of said end walls for movement therewith, means for subjecting one of said end walls to the pressures at one side of said valve seat, and means for subjecting the other of said end walls to the pressures at the other side of said valve seat.

2. A mechanism for controlling the cabin pressures of an aircraft comprising, in combination, a port for venting the cabin to the exterior thereof, a valve member for controlling the flow of fluid through said port, a pressure responsive member for controlling said valve member, passage means for connecting a surface on said pressure responsive member in communication with the interior and exterior of the cabin, a valve element for controlling communication through one of said passage means, and an evacuated expansible chamber device for controlling said valve element, said expansible chamber device having opposite end walls each movable relative to the other, means for limiting relative movement of said end walls, means operatively connecting said valve element to one of said end walls for movement therewith, means for subjecting one of said end walls to cabin pressure, and means for subjecting the other of said end walls to the pressure at the exterior of the cabin.

3. A mechanism for controlling the cabin pressures of an aircraft comprising, in combination, a port for venting the cabin to the exterior thereof, a valve member for controlling the flow of fluid through said port, a pressure responsive member for controlling said valve member, passage means for connecting a surface on said pressure responsive member in communication with the interior and exterior of the cabin, a valve element for controlling communication through one of said passage means, and an evacuated expansible chamber device for controlling said valve element, said expansible chamber device having opposite end walls each movable relative to the other, means for limiting relative movement of said end walls, means operatively connecting said valve element to one of said end walls for movement therewith, means for subjecting the one of said end walls operatively connected to said valve element to cabin pressure, and means for subjecting the other of said end walls to the pressure at the exterior of the cabin.

4. A mechanism for controlling the cabin pressures of an aircraft comprising, in combination, a port for venting the cabin to the exterior thereof, a valve member for controlling the flow of fluid through said port, a pressure responsive member for controlling said valve member, passage means for connecting a surface on said pressure responsive member in communication with the interior and exterior of the cabin, a valve element for controlling communication through one of said passage means, and an evacuated expansible chamber device for controlling said valve element, said expansible chamber device having opposite end walls each movable relative to the other, means for yieldingly urging said end walls apart, means for limiting movement of said end walls away from each other, means operatively connecting said valve element to one of said end walls for movement therewith, means for subjecting the one of said end walls operatively connected to said valve element to cabin pressure, and means for subjecting the other of said end walls to the pressure at the exterior of the cabin.

5. A mechanism for controlling the cabin pressures of an aircraft comprising, in combination, a port for venting the cabin to the exterior thereof, a valve member for controlling the flow of fluid through said port, a pressure responsive member for controlling said valve member, passage means for connecting a surface on said pressure responsive member in communication with the interior and exterior of the cabin, a valve element for controlling communication through one of said passage means, and an evacuated expansible chamber device for controlling said valve element, said expansible chamber device having opposite end walls of different area and each movable relative to the other, means for limiting relative movement of said end walls, means operatively connecting said valve element to the smaller one of said end walls for movement therewith, means for subjecting one of said end walls to cabin pressure, and means for subjecting the other of said end walls to the pressure at the exterior of the cabin.

6. A mechanism for controlling the cabin pressures of an aircraft comprising, in combination, a port for venting the cabin to the exterior thereof, a valve member for controlling the flow of fluid through said port, a pressure responsive member for controlling said valve member, passage means for connecting a surface on said pressure responsive member in communication with the interior and exterior of the cabin, a valve element for controlling communication through one of said passage means, and an evacuated expansible chamber device for controlling said valve element, said expansible chamber device having opposite end walls of different area and each movable relative to the other, means for limiting relative movement of said end walls, means operatively connecting said valve element to the smaller one of said end walls for movement therewith, means for subjecting the smaller one of said end walls to cabin pressure, and means for subjecting the other of said end walls to the pressure at the exterior of the cabin.

7. A mechanism for controlling the cabin pressures of an aircraft comprising, in combination, a port for venting the cabin to the exterior thereof, a valve member for controlling the flow of fluid through said port, a pressure responsive member for controlling said valve member, means for subjecting a surface on said pressure responsive member continuously to cabin pressure, passage means for connecting an opposite surface on said pressure responsive member in communication with the interior and exterior of the cabin, a valve element for controlling communication through one of said passage means, and an evacuated expansible chamber device for controlling said valve element, said expansible chamber device having opposite end walls each movable relative to the other, means for limiting relative movement of said end walls away from each other, means operatively connecting said valve element to one of said end walls for movement therewith, means for subjecting the one of said end walls operatively connected to said valve element to cabin pressure, and means for subjecting the other of said end walls to the pressure at the exterior of the cabin.

8. A mechanism for controlling the cabin pressure of an aircraft comprising, in combination, a port for venting the cabin to the exterior thereof, a valve member for controlling the flow of fluid through said port, a pressure responsive member for controlling said valve member, means for subjecting a surface on said pressure responsive member continuously to cabin pressure, passage means for connecting an opposite surface on said pressure responsive member in communication with the interior and exterior of the cabin, a valve element for controlling communication through the one of said passage means communicating with the exterior of the cabin, and an evacuated expansible chamber device for controlling said valve element, said expansible chamber device having opposite end walls each movable relative to the other, means for limiting movement of said walls from each other, means operatively connecting said valve element to one of said end walls for movement therewith, means for subjecting the one of said end walls operatively connected to said valve element to cabin pressure, and means for subjecting the other of said end walls to the pressure at the exterior of the cabin.

9. A mechanism for controlling the cabin pressure of an aircraft comprising, in combination, a port for venting the cabin to the exterior thereof, a valve member for controlling the flow of fluid through said port, a pressure responsive member for controlling said valve member, means for subjecting a surface on said pressure responsive member continuously to cabin pressure, passage means for connecting an opposite surface on said pressure responsive member in communication with the interior and exterior of the cabin, a valve element for controlling communication through the one of said passage means communicating with the exterior of the cabin, and an evacuated expansible chamber device for controlling said valve element, said expansible chamber device including concentric bellows each closed at one end by a movable plate individual to it, the space between said bellows being evacuated, means for subjecting the interior of the inner one of said bellows to cabin pressure, means for subjecting the exterior of the outer one of said bellows to the pressure at the exterior of the cabin, means for limiting movement of said closure plates away from each other, and means operatively connecting said valve element to the closure plate for the inner one of said bellows.

10. A mechanism for controlling the cabin pressure of an aircraft comprising, in combination, a port for venting the cabin to the exterior thereof, a valve member for controlling the flow of fluid through said port, a pressure responsive member for controlling said valve member, means for subjecting a surface on said pressure responsive member continuously to cabin pressure, passage means for connecting an opposite surface on said pressure responsive member in communication with the interior and exterior of the cabin, a valve element for controlling communication through the one of said passage means communicating with the exterior of the cabin, and an evacuated expansible chamber device for controlling said valve element, said expansible chamber device including concentric bellows fixed at one end and each closed at its opposite end by a movable plate individual to it, the space between said bellows being evacuated, means for subjecting the interior of the inner one of said bellows to cabin pressure, means for subjecting the exterior of the outer one of said bellows to the pressure at the exterior of the cabin, means for yieldably urging said plates apart, means for limiting relative movement of said plates in opposite directions, and means for operatively connecting said valve element to one of said plates.

11. A mechanism for controlling the cabin pressure of an aircraft comprising, in combination, a port for venting the cabin to the exterior thereof, a valve member for controlling the flow of fluid through said port, a pressure responsive member for controlling said valve member, means for subjecting a surface on said pressure responsive member continuously to cabin pressure, passage means for connecting an opposite surface on said pressure responsive member in communication with the interior and exterior of the cabin, a valve element for controlling communication through the one of said passage means communicating with the exterior of the cabin, and an evacuated expansible chamber device for controlling said valve element, said expansible chamber device including bellows having different transverse dimensions and arranged with their axes in the same straight line, means supporting one end of each of said bellows in a fixed position, plates movable relative to each other and each individual to one of said bellows for closing the opposite ends of said bellows, means for limiting relative movement between said plates, the space between said bellows being evacuated, means for subjecting a surface on one of said bellows to exterior pressure, means for subjecting a surface on the other of said bellows to cabin pressure, and means for operatively connecting said valve element to one of said plates.

12. In an apparatus for controlling the pressure in aircraft cabins, an evacuated expansible chamber device comprising a support member, bellows one inside the other and each having one end thereof in hermetically sealed fixed relation to said support member and each having another end movable relative to its own fixed end and to the movable end of the other, means for limiting relative separation of said last mentioned ends, means acting yieldingly between said last mentioned ends to exert a pressure between said ends varying with their degree of separation, means for limiting approach of the movable end of the outer bellows to said support member, a valve device movable with one of said last mentioned ends, means controlled by changes in position of said valve device for effecting changes in cabin pressure, means for subjecting the exterior of said outer bellows to ambient pressure, and means for subjecting the interior of said inner bellows to cabin pressure.

13. In an apparatus for controlling the pressure in aircraft cabins, an evacuated expansible chamber device comprising a support member, bellows one inside the other and each having one end thereof in hermetically sealed fixed relation to said support member and each having another end movable relative to its own fixed end and to the movable end of the other, means for limiting relative separation of said last mentioned ends, means acting yieldingly between said last mentioned ends to exert a pressure between said ends varying with their degree of separation, means for limiting approach of the movable end of the outer bellows to said support member, a valve device movable with the one of said last mentioned ends associated with the inner bellows, means controlled by changes in position of said valve device for effecting changes in cabin pressure, means for subjecting the exterior of said outer bellows to ambient pressure, and means for subjecting the interior of said inner bellows to cabin pressure.

14. In an apparatus for controlling the pressure in aircraft cabins, an evacuated expansible chamber device comprising a support member, bellows one inside the other and each having one end thereof in hermetically sealed fixed relation to said support member and each having another end movable relative to its own fixed end and to the movable end of the other, means for limiting relative separation of said last mentioned ends, means acting yieldingly between said last mentioned ends to exert a pressure between said ends varying with their degree of separation, means for varying the range of pressure exerted by said pressure exerting means, means for limiting approach of the movable end of the outer bellows to said support member, a valve device movable with the one of said last mentioned ends associated with the inner bellows, means controlled by changes in position of said valve device for effecting changes in cabin pressure, means for subjecting the exterior of said outer bellows to ambient pressure, and means for subjecting the interior of said inner bellows to cabin pressure.

15. In an apparatus for controlling the pressure in aircraft cabins, an evacuated expansible chamber device comprising a support member, bellows one inside the other and each having one end thereof in hermetically sealed fixed relation to said support member and each having another end movable relative to its own fixed end and to the movable end of the other, means for limiting relative separation of said last mentioned ends, means acting yieldingly between said last mentioned ends to exert a pressure between said ends varying with their degree of separation, means sealed to prevent communication between the exterior and the interior of said evacuated expansible chamber device for varying the action of said pressure exerting means, means for limiting approach of the movable end of the outer bellows to said support member, a valve device movable with the movable end of the inside bellows, means controlled by changes in position of said valve device for effecting changes in cabin pressure, means for subjecting the exterior of said outer bellows to ambient pressure, and means for subjecting the interior of said inner bellows to cabin pressure.

16. In an apparatus for controlling the pressure in aircraft cabins, in combination, an evacuated expansible chamber device comprising a support member, collapsible members one overlying the other and each having a portion fixed in hermetically sealed relation to said support member and a portion movable relative to said support member and to the movable portion of the other, means for limiting relative separation between said relatively movable portions, means acting yieldingly between said relatively movable portions for exerting a pressure between them varying with their degree of separation, means for limiting approach of the relatively movable portion of the overlying member to said support member, a valve device movable with the relatively movable portion of the underlying collapsible member, means controlled by changes in position of said valve device for effecting changes in cabin pressure, means for subjecting the exterior of said other, overlying collapsible member to ambient pressure, and means for subjecting the surface of said underlying collapsible member which forms an external wall of said expansible chamber device to cabin pressure.

17. In an apparatus for controlling the pressure in aircraft cabins, in combination, an evacuated expansible chamber device comprising a support member, coaxial resilient members of different diameters each having a portion fixed in hermetically sealed relation to said support member and a portion movable relative to said support member and to the movable portion of the other, means for limiting relative separation between the relatively movable portions of said resilient members, means acting yieldingly between said relatively movable portions for exerting a pressure between them varying with their degree of separation, means for limiting approach of the relatively movable portion of the member of greater diameter to said support member, a valve device movable with the relatively movable portion of the resilient member of smaller diameter, means forming a ported chamber associated with said valve device, means for subjecting the exterior of the resilient member of larger diameter to ambient pressure, and means for subjecting that surface of the resilient member of smaller diameter which forms an external wall of said expansible chamber device to cabin pressure.

18. In an apparatus for controlling the pressure in aircraft cabins, in combination, an evacuated expansible chamber device comprising a support member, collapsible members one overlying the other and each having a portion fixed in hermetically sealed relation to said support member and a portion movable relative to said support member and to the movable portion of the other, means for limiting relative separation between said relatively movable portions, means acting yieldingly between said relatively movable portions for exerting a pressure between them varying with their degree of separation, means for limiting approach of the relatively movable portion of the overlying member to said support member, a valve device movable with the relatively movable portion of the underlying collapsible member, means providing a passage controlled by said valve device as the position of the latter is changed, means for subjecting the exterior of said other, overlying collapsible member to ambient pressure, and means for subjecting the surface of said underlying collapsible member which forms an external wall of said expansible chamber device to cabin pressures.

WIN W. PAGET.

REFERENCES CITED

The following references are of record in the file of this patent:

UNITED STATES PATENTS

| Number | Name | Date |
|---|---|---|
| 2,208,554 | Price | July 16, 1940 |